United States Patent [19]

Hirs

[11] 4,326,964
[45] Apr. 27, 1982

[54] GRANULAR FILTER MEDIUM

[76] Inventor: Gene Hirs, 8228 Goldie, Walled Lake, Mich. 48088

[21] Appl. No.: 227,071

[22] PCT Filed: Apr. 4, 1980

[86] PCT No.: PCT/US80/00353
§ 371 Date: Apr. 4, 1980
§ 102(e) Date: Apr. 4, 1980

[87] PCT Pub. No.: WO81/02844
PCT Pub. Date: Oct. 15, 1981

Related U.S. Application Data

[63] Continuation-in-part of Ser. No. 23,469, Mar. 23, 1979, Pat. No. 4,197,208, and Ser. No. 23,470, Mar. 23, 1979, Pat. No. 4,197,205, which is a continuation-in-part of Ser. No. 879,296, Feb. 21, 1978, abandoned, and Ser. No. 801,702, May 31, 1977, abandoned, said Ser. No. 23,469, is a continuation-in-part of Ser. No. 879,281, Feb. 21, 1978, abandoned.

[51] Int. Cl.³ .................... B01D 23/24; B01D 39/06
[52] U.S. Cl. .................... 210/793; 210/275; 210/290; 210/506
[58] Field of Search .................... 210/791–798, 210/807, 192, 275, 277, 278, 284, 290, 500.1, 503, 504, 506, 510; 428/325, 402, 446

[56] References Cited

U.S. PATENT DOCUMENTS

| | | | |
|---|---|---|---|
| 2,145,901 | 2/1939 | Shoemaker | 210/504 |
| 3,104,196 | 9/1963 | Shannon | 428/407 |
| 3,247,294 | 4/1966 | Sabouni | 428/310 |
| 3,276,585 | 10/1966 | Kalinske | 210/790 |
| 3,343,680 | 9/1967 | Rice | 210/263 |
| 3,396,123 | 8/1968 | Urban | 210/504 |
| 3,424,674 | 1/1969 | Webber | 210/786 |
| 3,471,025 | 10/1969 | Dobson | 210/290 |
| 3,544,457 | 12/1970 | Tulley | 210/290 |
| 3,704,786 | 12/1972 | Lerner | 210/504 |
| 3,814,247 | 6/1974 | Hirs | 210/290 |
| 3,876,546 | 4/1975 | Hsiung | 210/290 |
| 3,933,629 | 1/1976 | Smith | 210/618 |
| 3,962,078 | 6/1976 | Hirs | 210/275 |
| 4,010,232 | 3/1977 | Labrecque | 428/310 |
| 4,048,068 | 9/1977 | Hirs | 210/284 |
| 4,190,533 | 2/1980 | Hirs | 210/793 |

Primary Examiner—Ernest G. Therkorn
Attorney, Agent, or Firm—Hiram P. Settle

[57] ABSTRACT

A hydrophilic oleophobic filter medium in granular form and composed of glass beads dispersed in a matrix of cured cement. The granules may be utilized in conjunction with naturally occurring materials, e.g., sand and/or anthracite. The granular density can be predetermined and varied. The granular shape is regular and controllable and the granular size can be graded for each density, so that the granules in a given filter level are of varient size, having a uniformity coefficient ranging from about 1.2 to 1.7. The method of making such granules includes the steps of casting a sheet of desired density and thickness, partially curing the sheet, severing the partially cured sheet to polygonal granules, curing the granules, optionally tumbling the granules, and finally screening them for final sizing.

7 Claims, 4 Drawing Figures

GRANULAR FILTER MEDIUM

RELATED APPLICATIONS

This application is a continuation-in-part of my earlier application, U.S. application Ser. No. 23,469, filed Mar. 23, 1979, now U.S. Pat. No. 4,197,208, which, in turn, is a continuation-in-part of my earlier filed U.S. application Ser. No. 879,281, filed Feb. 21, 1978, now abandoned; and this application is also a continuation-in-part of my earlier filed U.S. application 23,470, filed Mar. 23, 1979, now U.S. Pat. No. 4,197,205, which, in turn, is a continuation-in-part of my earlier application U.S. Ser. No. 879,296, filed Feb. 21, 1978 and of U.S. Ser. No. 801,702, filed May 31, 1977, both now abandoned.

BACKGROUND OF THE INVENTION

There have been many suggestions in the prior art of deep bed filters, i.e. filters consisting of carefully graded layers of granular filter medium, which are provided with an upper surface layer of relatively large, light weight materials which can act as a buffer or strainer for removing large particles, flocculents, or high concentrations of contaminants which have a tendency to surface load and plug the upper exposed surfaces. The prior art suggestions have attempted to provide particles for the upper surface which have the characteristics of (1) water-wetability, (2) relatively large uniform size, (3) relatively low, controlled density, and (4) liquid impermeability to avoid density change during use.

My earlier patent U.S. Pat. No. 4,190,533 proposes the utilization of particles of various materials, such as hollow glass beads, or pellets of either nitrile rubber, polysulfide rubber or polyurethane as the upper surface materials. This patent also specifically states that the particle size should be substantially uniform, and the particles should be of uniform shape. According to the disclosure of U.S. Pat. No. 4,190,533, the granules must have a uniformity coefficient of substantially about and not less than 1, wherein the uniformity coefficient is defined as the number obtained by dividing the sieve opening, in millimeters, which will pass 60% of the granules, by the sieve opening in millimeters which will pass just 10% of the granules.

In my earlier co-pending applications, of which this application is a continuation-in-part, I have proposed the utilization of different types of granules, specifically particles which comprise silica beads dispersed in a matrix of cured cement. The particles as earlier proposed were molded to shape, were cylindrical, and were of substantially uniform size and shape, although the granules might vary slightly.

It has now been found that granules of substantially uniform size and shape, as proposed both in my earlier U.S. Pat. No. 4,190,533 and in my earlier co-pending applications, tend to agglomerate and stick together upon backwashing, so that the particles will cling together and move upwardly as a piston or agglomerated mass when the filter bed is expanded during backwash. As a result, there is minimal relative movement among the particles during backwash, and there is no scrubbing action between the individual particles tending to separate the particles from the contaminants which have been removed by the particles during filtration.

BRIEF SUMMARY OF THE PRESENT INVENTION

The present invention now proposes a different approach to the provision of an upper particulate layer for a deep bed filter, in that the present invention provides a layer of particles which are (1) water-wettable, (2) relatively large, (3) of relatively low, controlled density, and (4) water impermeable, yet which have a varied, controllable, statistically distributed size variation which promotes agitation and scrubbing of the particles during backwash and which more efficiently separates the particles from agglomerated contaminants during backwash.

Specifically, the particles of the present invention comprise silica beads dispersed in a matrix of cured cement, as disclosed in my earlier applications Ser. Nos. 23,469, now U.S. Pat. No. 4,197,208, and 879,281, now abandoned, and such particles are intended for use generally as disclosed in my earlier application Ser. No. 23,470, now U.S. Pat. No. 4,197,205. However, the particles are of a different configuration and are manufactured by a different process so that the particle size distribution within a given layer of given density is such that the uniformity coefficient of the particles within the layer vary from about 1.2 to about 1.7. Thus, the particles within a given layer of a deep bed filter made in accordance with the present invention are not substantially identical in size, and appreciably improved backwashing characteristics are obtained, since the particles do not tend to cling together during backwash.

In the manufacture of the particles of the present invention, a slurry of silica beads dispersed in Portland cement is cast into a sheet, preferably of uniform thickness. The sheet is partially cured to a self-sustaining state and the sheet is then cut or severed to sub-divide the sheet into polygonal granules. These granules then are completely cured in their polygonal configuration. If desired, the particles can be utilized in their initial polygonal configuration or, optionally, the particles can be conventionally tumbled to round the corners of the particles without destroying their essentially polygonal configuration. Finally, the particles are screened to a specific given size, thereby eliminating any fines or shattered particles which may have been formed.

The particles then are utilized in a deep bed filter, either as the upper layer of a deep bed filter bed which includes lower layers of naturally occurring materials, such as anthracite or sand, or the deep bed filter can be composed entirely of particles of the present invention of graded density, as explained in my earlier filed application Ser. No. 23,470. By substantially varying the size of the particles formed during the cutting operation as, for example, severing in multiple directions at nominal dimensions of 0.125, 0.150 and 0.175 inches, particles of appreciably different sizes, yet of the same density, can be readily formed. The uniformity coefficient of particles within this variation of size will range from 1.2 to 1.7. During backwash, the particles will readily separate from one another, they will tumble and scrub against one another to more effectively remove contaminant particles, thereby substantially enhancing the backwash efficiency of the particle layer.

ON THE DRAWINGS

DETAILED DESCRIPTION OF THE PRESENT INVENTION

Figure 1:
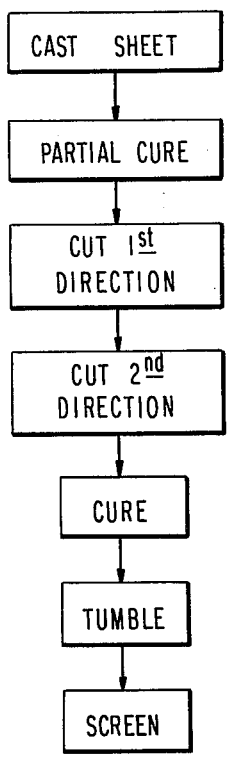
FIG. 1 is a flow diagram of the method of making filter medium granules of the present invention.

In FIG. 1, there is illustrated a flow diagram of the method of the present invention performing a filter medium granule of the present invention.

The first step in the method is the casting of a sheet of filter medium granule material. As explained in my earlier co-pending application Ser. No. 23,469, now U.S. Pat. No. 4,197,208, this material comprises hollow, sperical, silica beads dispersed in a matrix of cured cement.

The cement which is utilized is "normal portland cement" although other classes of cement, such as high-earlier-strength cement may be utilized, if desired. Cement is the preferred binder material, since it is very stable in aqueous environments, it is an inexpensive, readily available material, and it is water-wettable.

The hollow silica spheres may be either glass microballoons, which are hollow glass or sodium borosilicate beads having a size on the order of 44 to 175 microns and a specific gravity (dry) of about 0.32, or closed hollow spherical particles which are generated in coal-fired boiler plants and removed by electrostatic precipitators. These particles from the precipitators are generally discharged into a hopper at the bottom of the precipitator and are then washed with water into a lagoon. However, a small percentage of these particles float on top of the lagoon, and these particles have a specific gravity of less than one, and are essentially silica. These particles again are of a size on the order of about 70 microns or slightly larger, preferably on the order of 0.002 to 0.008 inches in diameter. Each such particle, whether, a glass microballoon or the silica particle from the precipitator, apparently has a tightly adherent surface layer of water which substantially completely surrounds the particles.

In preparing the synthetic particle of the present invention, the cement is mixed with the amount of water necessary for curing, and with the glass beads in the necessary proportions to yield a final specific gravity from about 1.04 to about 1.4. This specific gravity is chosen so that the granules will be lighter than the naturally occurring other filter media which may be used in conjunction therewith and yet heavier than water, so that the granules will stay in place during filtration operation and will return to their initial position after backwashing to clean the filter. Also, it is possible to form granules of graded density, so that granules of greater density can form the lower strata of a filter bed, and the lower strata will accurately reform after backwash. Where the particle is utilized to filter non-aqueous mixtures, the minimum specific gravity is more than 0.04 greater than the liquid, so that the particle will not float. Where the particle is utilized in conjunction with other filter materials in a stratified bed, the specific gravity of the particle is at least 0.04 more than the specific gravity of the next adjacent material of the bed.

To obtain the desired final densities, for example on the order of 1.1, it normally would be expected that a mixture of about ten parts cement, six parts water and fifty parts silica beads would be required. However, it was discovered that such a mixture results in a final molded granule having a specific gravity below 0.6. It has been found, by actual experimentation, that substantially greater amounts of cement and substantially lesser amounts of silica beads were required. At least 60% cement and 40% beads are required to yield synthetic composite particles having specific gravities on the order of 1.04 and greater. Preferably, from 60 to 85% cement and from 15 to 40% beads are utilized.

As can best be determined at the present time, each silica bead, whether from the electrostatic precipitators, or glass, is surrounded by strongly adherent film of water and this water reacts, during curing of the cement, with the cement to form closed air cells surrounding each bead. These cells substantially reduce the density of the final molded product, and explain the appreciable differential between the calculated absolute density of the granule and the lesser actual density.

As above explained, the cured cement is completely water-wettable, and the silica beads also are water-wettable. In the event that any portion of any silica bead is not encompassed within or encased within the cement or the closed cells surrounding each bead, there is no interference with the overall water-wettability of the granule, since the bead itself is water-wettable.

In the manufacture of the granules, the adherent water layer on the silica bead must be included in the calculations. For example, a granule having a specific gravity of approximately 1.15 can be manufactured from a dry mixture calculated to yield 66% cement and 34% silica beads, on a dry weight basis. The actual quantities involved were 300 grams of dry silica beads, 600 grams of cement, 291 grams of water with the silica, and 50 grams of added water.

To indicate the quantity of the air cells which are entrapped adjacent the beads, a granule formed from six parts cement having a specific gravity of 3.15, plus four parts hollow silica beads having a specific gravity of about 0.8, plus three parts of water would have a calculated solid, specific gravity of approximately 1.9. It has been found by experimentation that the specific gravity is approximately 1.0, indicating that there is over forty percent (40%) air cells in this granule which, in effect, reduce its specific gravity. Where these granules are cured at one hundred percent (100%) humidity, there was no substantial increase in the weight of the particles after extended soaking periods in excess of nine days.

At the same time, the particles or granules have remarkable structural integrity and structural strength. Testing has indicated that the granules have compressive strengths on the order of from about 2,000 to about 2,500 pounds per square inch, as compared to a compressive strength of about 3,000–5,000 pounds per square inch for structural concrete.

The evidence to date indicates that each silica bead or sphere, which is approximately 0.002 to 0.008 inches in diameter, has a surface skin of water surrounding the bead which is much thicker than the bead itself and which holds to the bead with greater tenacity. This surface layer or boundary of water combines chemically with the cement during the curing period, leaving closed cells around a substantial portion of each particle.

In the method of the present invention, the cement, water and bead slurry is cast as a sheet or slab in a suitable open-topped, tray-type mold which may be of any desired width and length dimension, the cast sheet having a thickness which is equal to one desired dimension of the final granule. For example, if it is desired to form a granule which is in approximately the shape of a cube having a dimension of 0.125 inches, then the cast sheet will have a thickness of 0.125 inches.

The cast sheet is partially cured while still in the mold, the degree of cure being sufficient to make the slurry sufficiently strong to sustain a cut shape, yet being cured to an extent such that it can be cut readily by a die, a rotary knife, or the like. This partial curing time is relatively short, on the order of five to twenty minutes for most compositions.

Figure 2:
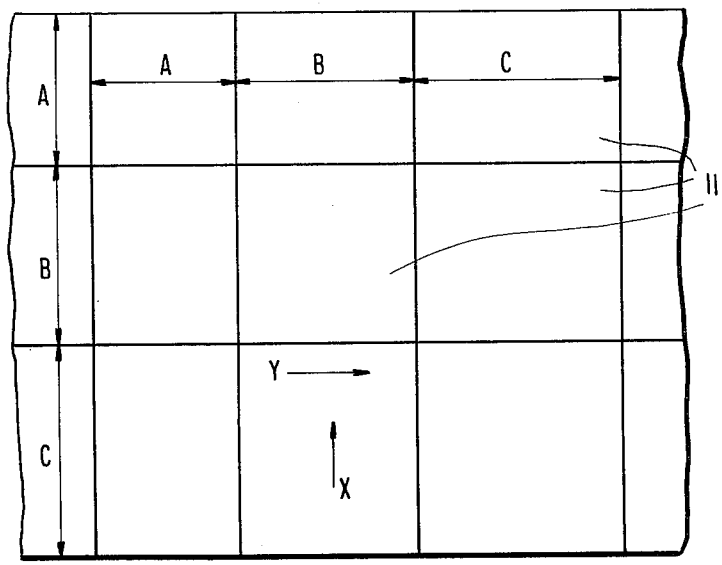
FIG. 2 is a diagrammatic representation of the cutting steps of the method of FIG. 1.
Figure 4:
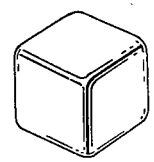
FIG. 4 is a perspective view of a particle or granule of the present invention.
Figure 3:
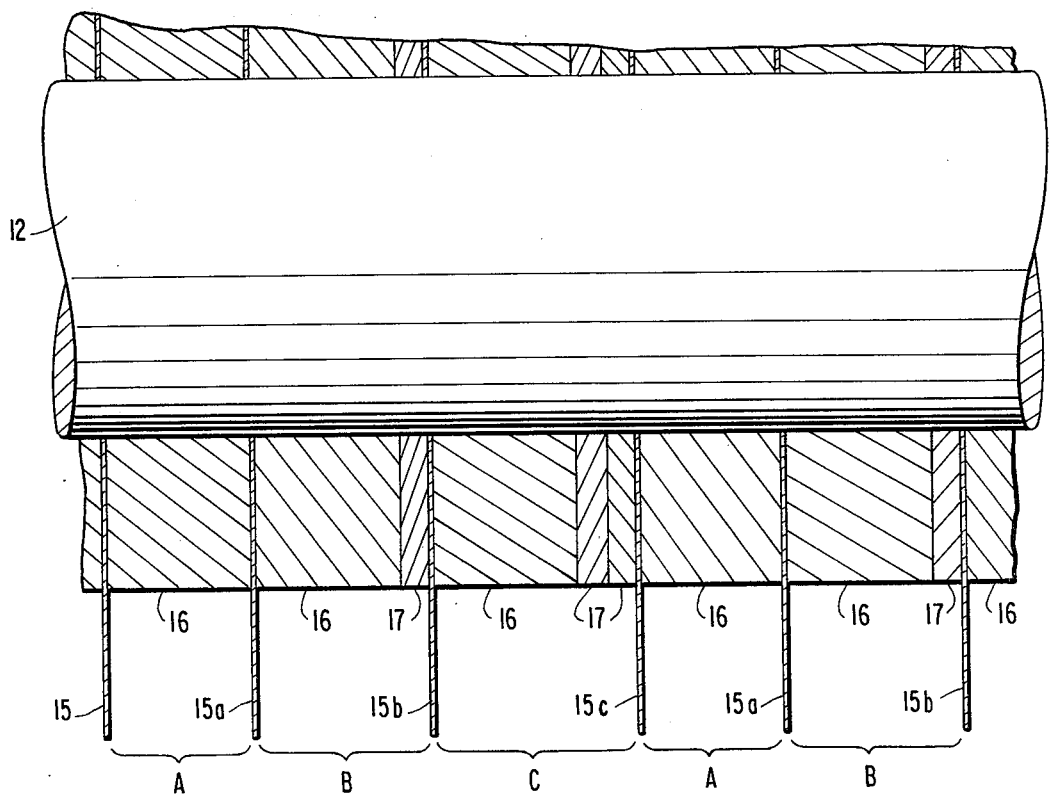
FIG. 3 is a schematic drawing of a cutting apparatus used in connection with the method of the present invention.

After such partial curing, the cast sheet is severed by any desired means to form particles of the desired size and shape. One method of forming particles of a desired rectilinear shape is illustrated in FIGS. 2 and 3. In FIG. 2, the cast sheet or slab is indicated by the reference numeral 10 and this slab, either in the mold or removed from the mold, is severed into specific granules 11 by the severing medium shown in in FIG. 3.

The severing medium of FIG. 3 is an elongated shaft 12 which can be driven by any suitable means, or even manually operated if desired. The shaft 12 is provided with a plurality of annular blades 15, 15a, 15b, and 15c, which are mounted on the shaft. The blades 15a–15c are spaced from one another by spacers 16, 17, which are also annular, which surround the shaft, and which are interposed between adjacent blades in a predetermined pattern. The drawing shows only part of a cutter assembly or gang wherein the increment of three blades 15a, 15b and 15c is repeated across the entire slab dimension.

Assuming that the sheet or slab has a thickness of 0.125 inches, then the blades 15–15c must project by a dimension of at least 0.125 beyond the exterior periphery of the spacers 16, 17, so that the blades can completely cut through the thickness of the sheet of slab. Assuming that it is desired to form granules having a dimension A of 0.125 inches, a dimension B of 0.150 inches and a dimension C of 0.175 inches, then these same dimensions occur in the cutting assembly of FIG. 3. One convenient way of obtaining these dimensions is to provide spacers 16 which are of an axial extent equal to 0.125 inches less the thickness of the blade 15, and spacers 17 of an axial dimension of 0.025 inches. If the cutting assembly of FIG. 3 is moved in a first direction x relative to the sheet or slab of FIG. 2 and then are moved in the relative direction y lying normal to the direction x, it will be seen that the sheet will be severed into rectilinearly shaped solid particles or granules of a predetermined particle size distribution. Assuming the above dimensions, i.e. the thickness is uniformly 0.125; the dimension A is 0.125 inches; the dimension B is 0.150 inches; and the dimension C is 0.175 inches, then the following particle distribution will result:

TABLE I

| (Density 1.05) | | | |
|---|---|---|---|
| PARTICLE SIZE | | | NUMBER OF PARTICLES |
| Thickness | Width | Length | PER INCREMENT |
| 0.125 | 0.125 | 0.125 | 1 |
| 0.125 | 0.150 | 0.150 | 1 |
| 0.125 | 0.175 | 0.175 | 1 |
| 0.125 | 0.125 | 0.150 | 2 |
| 0.125 | 0.125 | 0.175 | 2 |
| 0.125 | 0.150 | 0.175 | 2 |

If a plurality of different layers of particles of the present invention are to be utilized or, if different sizes and densities are desired, then a second slab having a density of about 1.2 and a thickness of 0.1000 inch can be poured. If this slab were then cut as above explained, but where the dimension A is 0.75 inch; the dimension B is 0.1000 inch; and the dimension C is 0.125 inch, the following distribution of Table II would be obtained:

TABLE II

| (Density 1.20) | | | |
|---|---|---|---|
| PARTICLE SIZE | | | NUMBER OF PARTICLES |
| Thickness | Width | Length | PER INCREMENT |
| 0.100 | 0.075 | 0.075 | 1 |
| 0.100 | 0.100 | 0.100 | 1 |
| 0.100 | 0.125 | 0.125 | 1 |
| 0.100 | 0.075 | 0.100 | 2 |
| 0.100 | 0.075 | 0.125 | 2 |
| 0.100 | 0.100 | 0.125 | 2 |

If a third, more dense, yet smaller layer were desired, a slab having a thickness of 0.075 inches can be poured, and the cutter blades 15 provided on the shaft 12 at only two widths, i.e. 0.050 and 0.075. The resultant particles would be distributed as follows:

TABLE III

| (Density 1.35) | | | |
|---|---|---|---|
| PARTICLE SIZE | | | NUMBER OF PARTICLES |
| Thickness | Width | Length | PER INCREMENT |
| 0.075 | 0.050 | 0.050 | 1 |
| 0.075 | 0.075 | 0.075 | 1 |
| 0.075 | 0.050 | 0.075 | 2 |

Following the formation of the particles by curing, as above explained, the particles are cured to a fully set cement matrix in which the silica beads are dispersed, as above explained. Preferably, the curing occurs in the tray-like mold, and such curing takes place conventionally, generally requiring a total cure time of two to three days.

Next, the particles are preferably tumbled in a rotary tumbling mill for a limited period of time. This tumbling knocks off the sharp edges and corners of the particles, while retaining their essentially rectilinear shape. This tumbling may be desirable to avoid the formation of fines during operation of a deep bed filter, and particularly during backwashing when the particles rub and abrade against one another as the bed is expanded by the introduction of backwash liquid. Even if not tumbled, any fines will be removed in the backwash liquid.

Following tumbling, the particles are preferably screened to insure their falling within predetermined size limits and to insure their falling within the desired uniformity coefficient. The screening also eliminates any fines which are generated during the tumbling action.

The final particles from the process are essentially rectilinear and are essentially of the dimensions above set forth. However, the tumbling will result in variations in size between the individual particles, all of which is desirable in order to prevent overdue uniformity of the particles, for the reasons above set forth in detail.

The particles, after their complete formation, are utilized as set forth in detail in my earlier filed application, Ser. No. 23,470, filed Mar. 23, 1979, now U.S. Pat. No. 4,197,205. A deep bed filter may comprise only particles made in accordance with the present invention and of varying density, or a deep bed filter may comprise one or more upper layers of particles of the present invention over graded layers of naturally occurring materials, e.g. anthracite, sand, or combinations of anthracite and sand. As a further alternative, the lower levels of a deep bed filter may include layers of nut or fruit pit shells, such as black walnut shells, English walnut shells, pecan shells, apricot pit shells, peach pit shells, and the like materials.

The adjustability of the specific gravity of the synthetic particles by varying the proportions of silica beads and cement gives great flexibility to the utilization of the particles in conjunction with other filter media and in the filtration of liquids other than water. The minimum specific gravity of the synthetic particles of this invention is about 0.04 greater than the specific gravity of the liquid being filtered, and the maximum specific gravity of the particles is about 0.04 less than the specific gravity of the next adjacent lower layer in the filter bed, up to a maximum specific gravity of about 1.5. Obviously, materials other than those specifically disclosed for the other layers of the deep bed filter can be used to achieve the overall desired parameters. The specific gravity of the materials in the uppermost layers are selected as desired, based upon the specific materials used in the lowermost layers.

Where the particles or granules of the present invention are utilized in multiple layers, either to form a complete filter bed or to form upper layers superimposed on anthracite, coal, fruit pits, nut shells, or the like, the particles in successive layers vary in density (the density increasing in the direction of flow through the bed) and in size (the size decreasing in the direction in each layer is defined by the "uniformity coefficient", and the particle size in each layer is defined by the "effective size", where that term is defined as that opening which will just pass 10% of the particles. An exemplary bed may comprise an upper layer of granules having an effective size of 0.125 inches, a second layer of particles having an effective size of 0.075 inches, and a third layer of particles having an effective size of 0.050 inches, all superimposed on a bottom layer of normal filter sand.

The primary improvement of the particles of the present invention, as compared with those which I have disclosed in my earlier patents and applications, lies in their behavior upon backwashing. The present invention provides particles of variant nominal sizes which differ materially from one another and which provide a uniformity coefficient substantially greater than one and preferably falling within the range of from about 1.2 to about 1.7 within specific layers in the bed at which the particles of the present invention are of the same specific gravity. In other words, within each layer of cement-silica bead particles, the specific gravity is substantially identical, yet the sizes vary substantially, within the defined uniformity coefficient range. This means that in each layer of particles, particles expose different cross-sectional areas to the liquid flowing through the bed during backwash, so that the bed layer particles move at different rates in the backwash liquid. As a result, the particles rub against one another, and a much more desirable, nonuniform scrubbing action results, with enhanced separation of agglomerated contaminants from the particles constituting the bed result.

After backwashing, the bed is reformed into substantially distinct layers which correspond to the layers prior to backwash by simply reducing the flow of backwash liquid gradually and then ceasing backwash entirely, so that the particles can settle into substantially their same positions as before the backwash started.

Having completely and fully disclosed my invention, I now claim:

1. In a method of filtering contaminants from a liquid, the steps of:

flowing contaminated liquid through a deep bed filter consisting of vertically superimposed filter media layers where the uppermost layers consist of a plurality of layers of synthetic granules comprising hollow silica beads in a matrix of cured cement, said layers being superimposed in a reverse graded manner with the uppermost layer comprising the least dense particles having an effective size of approximately 0.050 inches, effective size being defined as an opening that will just pass 10% of the particles, the particles in each layer also having a uniformity coefficient of approximately 1.2 to 1.4 wherein the uniformity coefficient is defined as a number obtained by dividing the size opening which will pass 60% of the granules, if they were uniformly graded, by the sieve opening which will just pass 10% of the granules, if they were uniformly graded, these particles having a specific gravity in the range of 1.01 to about 1.40, and all of said granules being superimposed on a bottom filter media layer that is standard filter sand, terminating the flow of contaminated liquid after the filter has become at least partially clogged by accumulated contaminants, rejuvenating the deep bed filter by flowing backwash liquid upwards through the bed to expand all the different filter layers and to expand these layers substantially in situ but with considerable relative motion of one particle to the next to get a scrubbing action between particles so that it will facilitate the removal of accumulated contaminants, reforming the bed with substantially distinct layers by reducing the backwash and then cutting it down entirely, so that the particles settle substantially the same as before backwash started.

2. A method of filtering contaminants from a liquid by flowing the liquid through a deep bed filter having a plurality of layers of filter medium which are graded in size and density, the medium of each of the layers increasing in density and decreasing in size in the direction of fluid flow, the improvement wherein the uppermost layer comprises granules of silica beads dispersed in a matrix of cured cement, the granules of the uppermost layer have an effective size of about 0.125 inch where the effective size is defined as that sieve opening which will pass just 10% of the particles, and the granules in said uppermost layer have a uniformity coefficient ranging from about 1.2 to 1.7, where the uniformity coefficient is defined as that number obtained by dividing that sieve opening which will pass 60% of the granules of said layer by that sieve opening which pass just 10% of the granules of said layer.

3. A multi-layered filter medium adapted for use as successive layers in a deep bed filter, said medium comprising individual particles formed of hollow silica beads distributed in a matrix of cured cement, the specific gravity of the particles in each layer being uniform and ranging from about 1.02 to about 1.5, and the particles in each layer being larger and of lower specific gravity than the particles in the next lower layer, the particles in each layer being of at least two substantially different sizes and the particles in each layer having a uniformity coefficient ranging from about 1.2 to about 1.7.

4. A filter medium comprising a plurality of particles adapted for use as a single layer in a multi-layer deep bed filter, each particle comprising a plurality of hollow silica beads distributed in a matrix of cured cement, the specific gravity of the particles ranging from about 1.04 to about 1.5, and said particles being of at least two substantially different nominal dimensional sizes, and the uniformity coefficient of said particles ranging from about 1.2 to about 1.7.

5. In a deep bed filter for filtering contaminants from a liquid by flowing the liquid through a particulate filter bed having a plurality of layers of particulate filter medium which are graded in size and density, the medium of each of the layers increasing in density and decreasing in size in the direction of fluid flow, the improvement wherein the medium is a myriad of granules comprising hollow silica beads distributed in a matrix of cured cement, the granules having an effective size of about 0.125 inch where the effective size is defined as that sieve opening which will pass just 10% of the granules, the granules in said uppermost layer having a uniformity coefficient ranging from about 1.2 to about 1.7, where the uniformity coefficient is defined as that number obtained by dividing that sieve opening which will pass 60% of the granules of said layer by that sieve opening which pass just 10% of the granules of said layer.

6. A multi-layered deep bed filter comprising a plurality of layers of individual particles formed of hollow silica beads distributed in a matrix of cured cement, the specific gravity of the particles in each layer being uniform and ranging from about 1.02 to about 1.5, and the particles in each layer having a larger effective size and being of lower specific gravity than the particles in the next lower layer, the particles in each layer being of at least two substantially different sizes, and the particles in each layer having a uniformity coefficient ranging from about 1.2 to about 1.7.

7. In a method of filtering contaminants from a liquid, the steps of:
flowing contaminated liquid downwardly through a deep bed comprising vertically superimposed filter media layers where at least the two uppermost layers are composed of a plurality of synthetic granules of hollow silica spheres in a cured cement matrix that are superimposed in a reverse graded manner with the least dense granules in a first uppermost layer, and a second layer of more dense granules, the granules in said second layer having a specific gravity at least 0.04 greater than those of the first layer and having an appreciably lesser effective size, the effective size being defined as an opening that will just pass 10% of the particles, the granules of each layer also having a uniformity coefficient of approximately 1.2 to 1.7 wherein the uniformity coefficient is defined as a number obtained by dividing the size opening which will pass 60% of the granules, if they were uniformly graded, by the sieve opening which will just pass 10% of the granules, if they were uniformly graded, and the granules all having a specific gravity in the range of 1.01 to about 1.40, and a lower filter medium layer of standard filter sand,
terminating the flow of contaminated liquid after the filter has become at least partially clogged by accumulated contaminants,
flowing backwash liquid upwards through the bed to expand all the different filter layers substantially in situ but with sufficient relative motion to cause a scrubbing action between particles, thereby facilitating the removal of accumulated contaminants, and
terminating the flow of backwash liquid to reform the bed to substantially its original configuration.

* * * * *